United States Patent
Marck et al.

(10) Patent No.: US 10,857,847 B2
(45) Date of Patent: Dec. 8, 2020

(54) SUSPENSION BUMPER FOR THE SUSPENSION OF A VEHICLE COMPRISING IMPROVED PROGRESSIVITY

(71) Applicant: PSA AUTOMOBILES S.A., Poissy (FR)

(72) Inventors: Olivier Marck, Marchaux (FR); Damien Piranda, Anteuil (FR); Jerome Muller, Nommay (FR); Jean Marc Allegre, Limours (FR); Frederic Guigand, Igny (FR)

(73) Assignee: PSA AUTOMOBILES SA, Poissy (FR)

( * ) Notice: Subject to any disclaimer, the term of this patent is extended or adjusted under 35 U.S.C. 154(b) by 115 days.

(21) Appl. No.: 16/090,633

(22) PCT Filed: Mar. 6, 2017

(86) PCT No.: PCT/FR2017/050488
§ 371 (c)(1),
(2) Date: Oct. 2, 2018

(87) PCT Pub. No.: WO2017/174886
PCT Pub. Date: Oct. 12, 2017

(65) Prior Publication Data
US 2019/0118599 A1    Apr. 25, 2019

(30) Foreign Application Priority Data

Apr. 4, 2016 (FR) ...................................... 16 52929

(51) Int. Cl.
*B60G 7/04* (2006.01)
*B60G 11/52* (2006.01)
(Continued)

(52) U.S. Cl.
CPC ................ *B60G 7/04* (2013.01); *B60G 11/52* (2013.01); *B60G 15/066* (2013.01);
(Continued)

(58) Field of Classification Search
CPC .......... B60G 7/04; B60G 11/52; B60G 11/22; B60G 15/065; B60G 15/066;
(Continued)

(56) References Cited

U.S. PATENT DOCUMENTS 5,308,104 A * 5/1994 Charles ................. B60G 11/52
267/220
6,908,076 B2 * 6/2005 Hayashi ............... B60G 13/003
267/153

(Continued)

FOREIGN PATENT DOCUMENTS

FR    2644735 A1    9/1990
JP    2006017192 A    1/2006

OTHER PUBLICATIONS

International Search Report for corresponding PCT/FR2017/050488 dated May 8, 2017.
(Continued)

*Primary Examiner* — Robert A. Siconolfi
*Assistant Examiner* — San M Aung
(74) *Attorney, Agent, or Firm* — Sandberg Phoenix & von Gontard, P.C.

(57) ABSTRACT

Suspension bumper for the suspension of a motor vehicle, comprising a molded part made of elastomer being essentially symmetrical in revolution about a main axis of compression, this bumper comprising one end forming a crown comprising bearing faces (48) designed to receive pressure from a moving part, the end crown comprising protuberances (58, 60) that are separated from one another by notches (54) distributed over the perimeter of this crown,
(Continued)

these bosses having bearing faces (48) arranged at various heights.

10 Claims, 2 Drawing Sheets

(51) Int. Cl.
| | |
|---|---|
| *B60G 15/06* | (2006.01) |
| *F16F 9/58* | (2006.01) |
| *F16F 1/36* | (2006.01) |
| *F16F 1/373* | (2006.01) |
| *F16F 1/376* | (2006.01) |
| *F16F 1/44* | (2006.01) |

(52) U.S. Cl.
CPC ............ *F16F 1/3615* (2013.01); *F16F 1/376* (2013.01); *F16F 1/3732* (2013.01); *F16F 9/58* (2013.01); *B60G 2202/143* (2013.01); *B60G 2204/128* (2013.01); *B60G 2204/4502* (2013.01); *B60G 2204/45021* (2013.01); *B60G 2206/42* (2013.01); *F16F 1/44* (2013.01)

(58) Field of Classification Search
CPC .......... B60G 2202/14; B60G 2202/143; B60G 2204/125; B60G 2204/4502; B60G 2204/45021; B60G 2206/42; F16F 1/44; F16F 1/54; F16F 1/3615; F16F 1/3732; F16F 1/376; F16F 9/58; F16F 2230/00; F16F 2230/02; F16F 2224/025; F16F 2224/05; F16F 3/093
USPC ......... 267/30, 140.3, 153, 220, 35, 292, 293
See application file for complete search history.

(56) References Cited

U.S. PATENT DOCUMENTS

| | | | |
|---|---|---|---|
| 8,191,692 B2* | 6/2012 | Mori ...................... | F16F 9/585 |
| | | | 188/284 |
| 8,210,508 B2* | 7/2012 | Hwang ................. | F16F 1/3732 |
| | | | 267/153 |
| 2004/0178552 A1* | 9/2004 | Schudt ................. | B60G 15/068 |
| | | | 267/220 |
| 2010/0025903 A1* | 2/2010 | Thye-Moormann ........................ | |
| | | | F16F 1/3732 |
| | | | 267/153 |
| 2013/0119593 A1* | 5/2013 | Konno .................... | F16F 9/585 |
| | | | 267/293 |
| 2013/0161888 A1* | 6/2013 | Szekely ................... | F16F 9/58 |
| | | | 267/220 |

OTHER PUBLICATIONS

Written Opinion for corresponding PCT/FR2017/050488 dated May 8, 2017.

\* cited by examiner

Fig. 1
PRIOR ART
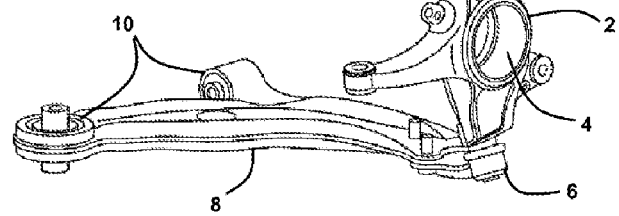
Fig. 2
PRIOR ART
Fig. 3
PRIOR ART
Fig. 4
PRIOR ART
Fig. 5
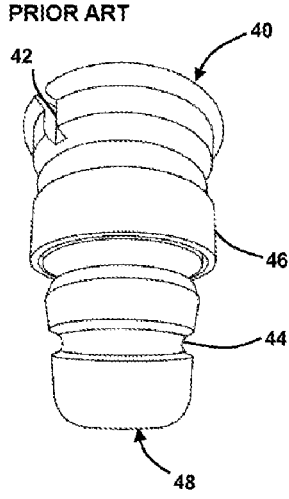 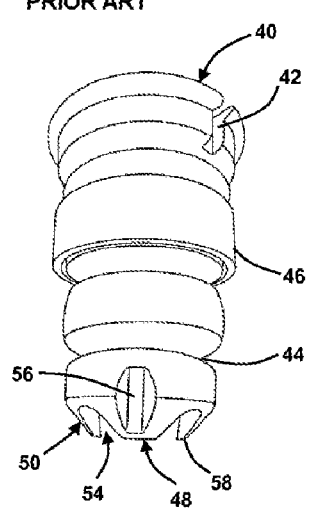 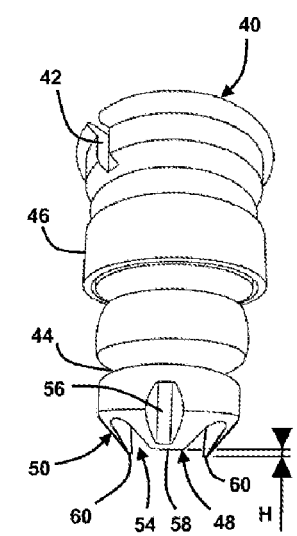

SUSPENSION BUMPER FOR THE SUSPENSION OF A VEHICLE COMPRISING IMPROVED PROGRESSIVITY

CROSS-REFERENCE TO RELATED APPLICATIONS

This application is filed under 35 U.S.C. § 371 to continue International App. No. PCT/FR2017/050488 which claims the priority to French application 1652929 filed on Apr. 4, 2016, both of which are incorporated herein by reference.

BACKGROUND

This invention concerns a suspension bumper for the suspension of a motor vehicle, as well as a motor vehicle fitted with such suspension bumpers.

Generally, motor vehicles have, on each wheel, a suspension with a coil spring, a shock absorber which brakes the suspension's movements, and a suspension bumper, which the vehicle's body sections press against when the suspension is at full extension, in order to stop this movement, avoiding a shock.

The suspension bumpers are specially created by molding an elastomer material with the suitable mechanical resistance and elastic characteristics which allow for complex forms to be molded in one, single operation.

To improve the progressivity of the rigidity of the suspension bumper, particularly for its initial extension, deformed plastic materials with better progressivity or lower density can be used. However, these improved materials present higher costs and reduced endurance.

With the same aim, a well-known type of suspension bumper, namely that presented by the French Pat. No. 2643122, includes a generally cylindrical shape, with holes drilled across the axis to allow for the rod of a shock absorber to be passed through, forming in the upper section, both in the interior and on the exterior, a series of annular rims, which facilitate this bumper's axial flattening.

Furthermore, to obtain an initial contact on the more progressive moving part, the end face of the main section, called the bumper nose, forming a crown which ensures this contact, includes a series of dog points, distributed across the circumference of this bumper. We hence obtain a compression on a small dog point height, presenting a reduced section, which gives low rigidity for the initial extension, just after contact on the bumper.

However, as the moving piece simultaneously presses against all dog points, we obtain a constant initial rigidity during the small compression of these dog points, followed by the compression of the main section of the bumper, providing a second rigidity which is much higher.

The rigidity of the small initial extension of this type of bumper is hardly progressive. In certain cases, we can obtain noises upon contact with the bumper, as well as limited comfort due to the braking force of this bumper increasing too quickly.

SUMMARY

This invention namely aims to avoid these inconveniences of the previous technique.

For this purpose, a suspension bumper for the suspension of a motor vehicle is disclosed, having a part molded in elastomer, which has approximate rotational symmetry around a main compression axis. The bumper comprises an end which forms a crown with bearing faces intended to receive the pressure of a moving part, this bumper being remarkable in that the end crown includes bosses, separated from each other by notches distributed around the circumference of this crown, wherein, the bosses present bearing faces at various heights.

One advantage of this suspension bumper is that the various heights of the bearing faces of the bosses provide, upon initial contact of the moving part over a small extension of successive supports following the heights of these faces, which generates a retraction force at the beginning of this highly progressive contact, avoiding noise. Furthermore, the high progressivity in the beginning of the braking avoids shocks, which improves the suspension comfort.

We will note that the suspension bumper, can be created economically via a simple adaptation of the molding tools used for existing bumpers, without modifying any other suspension components.

The suspension bumper can also include one or several of the following characteristics, which can be combined amongst them.

Advantageously, the notches have a rounded bottom.

Advantageously, the end forming the crown presents a conical external form which narrows at the bottom.

In particular, the notches can include a height exceeding half of the exterior conical form.

Advantageously, the bosses have vertical grooves on their outer surface.

Advantageously, the height difference between the different bearing faces ranges between 0.5 and 5 mm.

In particular, the height difference between the different bearing faces ranges can be approximately 2 mm.

Advantageously, for a compression beginning after pressure on all bearing faces, the bumper's dynamic rigidity across several millimeters is between 20 and 30 N/mm.

Advantageously, the suspension bumper is created using a polyurethane elastomer material.

A motor vehicle is also disclosed wherein the vehicle has a suspension fitted with suspension bumpers with any one of the aforementioned characteristics.

BRIEF DESCRIPTION OF THE FIGURES

The claimed invention will be better understood and other characteristics and advantages will appear more clearly following the description below which gives non-exhaustive examples, referencing the annexed illustrations, in which:

FIG. 1 is an overview of a MacPherson front suspension for a motor vehicle, fitted with a suspension bumper in accordance with the prior art;

FIG. 2 is an axial cross-sectional view presenting the suspension bumper of this suspension;

FIGS. 3 and 4 are views of two different suspension bumpers in accordance with the prior art;

FIG. 5 is a view of a suspension bumper in accordance with the invention; and

DETAILED DESCRIPTION

Figure 6:
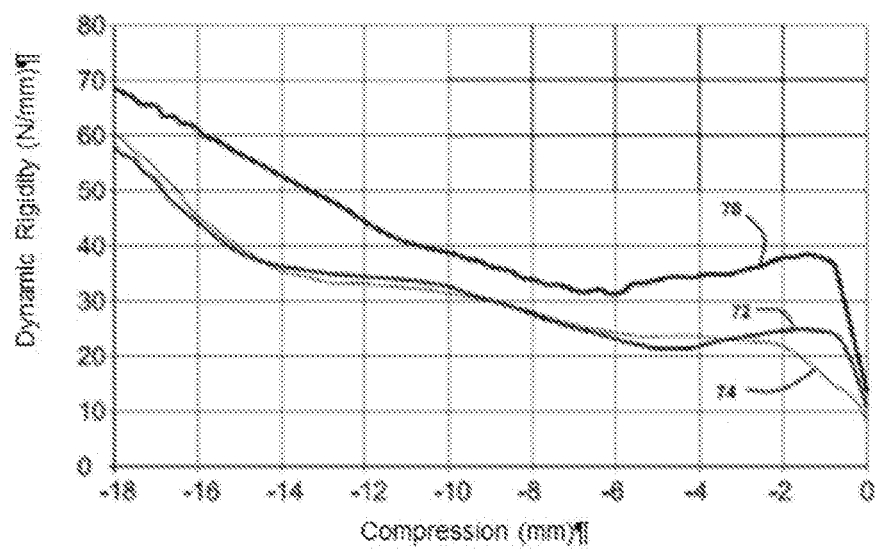
FIG. 6 is a graph presenting force values depending on the compression for the suspension bumpers presented in FIGS. 3, 4 and 5.

FIGS. 1 and 2 present a hub support 2 comprising a central bore 4, intended to contain bearings supporting the hub of a wheel, with a ball joint 6 at its base, attached at the point of a lower wishbone suspension 8.

The wishbone suspension 8 includes two pivots 10 which are longitudinally aligned in the vehicle, allowing for the wishbone to move about an axis passing through these two pivots.

A telescopic shock absorber 12 with a main section 14 has a base surrounded by a yoke 16 created from metal sheeting which holds the upper part of the hub support 2. Two transverse screws cross the drilled holes in this yoke 16 in order to ensure that its hold on the hub support 2 is sufficiently strong.

The rod 18 of the shock absorber 12 includes an upper part which is fixed to a mount 20 intended to be assembled under a metal sheet of the vehicle's body. A helical suspension spring (not pictured) includes a base supporting a metal sheet 22 attached around the body of the shock absorber 14, and a supporting vertex on a free-rotating part 24, held under the mount 20.

An elastomer suspension bumper 30 forms a rotating part with an axial bore which receives the rod 18, an upper face attached underneath the mount 20, and a lower face designed to receive the pressure of the upper end of the body 14 when the depression of the suspension is sufficient.

For the suspension bumper 30 presented in FIGS. 1 and 2, the inner face forming a continuous end crown is completely compressed when the body of the shock absorber 14 comes into contact with it from above. Straight away, a certain rigidity is obtained which is not very progressive at the beginning of the bump, which causes noise and discomfort, given the sudden and abrupt development of this rigidity.

FIG. 3 presents a well-known suspension bumper 30 with a flat, upper surface 40 which is perpendicular to the main compression axis, intended to be attached to the vehicle's body section, comprising an indexing notch 42 allowing for it to be positioned.

The body of the suspension bumper 30 includes a series of annular depressions 44 which facilitate the axial compression of the material. A rigid ring 46 holds the central section of the body of the suspension bumper 30, in order to give it better hold and to avoid it bending during strong compression.

The lower end of the suspension bumper 30 forms a flat bearing face 48 which is continuous. As this bumper begins to compress, rigidity rapidly increases, causing noise and discomfort.

FIG. 4 presents a well-known variant of this suspension bumper 30, comprising an external conical form 50 at its base, centered on the axis and narrowing at the bottom, and a central depression, which leaves a bearing face 48 forming a narrow crown between this central depression and this external conical form.

The bearing face 48 has four evenly distributed notches 54, the notches having a rounded upper contour and a height which corresponds to roughly three quarters of the external height of the conical form 50. The notches 54 leave four bosses 58 between them, each with a width similar to that of the notch. The nose of the bumper presents a general petal form.

Furthermore, each boss 58 has, on the exterior and in the center, a narrow vertical groove 56 which begins slightly above the bearing face 48 and which extends half-way over the external conical form 50.

A bearing face 48 is formed by the end of the four bosses 58 which presents a significantly reduced surface, and high flexibility due to the possible deformation of these bosses in a radial direction towards the central depression and towards the exterior, e.g., in the tangential direction towards the notches 54. The vertical grooves 56 contribute to facilitating the deformation of these bosses 58.

However, the arrival of the moving part simultaneously across the four bosses 58 creates an initial rigidity, presenting a unique slope, which may cause noise and discomfort.

FIG. 5 presents a variant of the suspension bumper presented in FIG. 4, comprising two long and opposed bosses 60, at a height slightly above a value H, which is advantageously between 0.5 and 5 mm.

We hence obtain upon the first compression of the bumper, following the value H, a compression of only two long bosses 60, which creates a significantly low initial rigidity. We then obtain a compression of the two following short bosses 58, which are added, creating a more significant rigidity which nevertheless remains rather low, due to the various recesses around these bosses. For the initial compression, we obtain a two-slope rigidity.

Advantageously, the long bosses 60 are alternated with the short bosses 58, which maintains a bearing force which is symmetrical with the axis of this bumper upon arrival of the moving part.

In particular, the material of the bumper can be a polyurethane elastomer.

As a variant, various numbers of notches 54 can be used, as well as more than two boss heights.

FIG. 6 presents, depending on the compression expressed on the horizontal axis in millimeters, the dynamic rigidity of the bumpers, which is expressed in Newtons per millimeter, for the bumper presented in FIG. 3 with the first curve 70, FIG. 4, with the second curve 72, and FIG. 5 with the third curve 74.

We can observe on the first curve 70, for the bumper of FIG. 3 with the large nose, a rapid increase in rigidity over the first millimeter of compression, which reaches a value of approximately 37 N/mm, then a progressive increase after 8 mm of compression.

We observe on the second curve 72 for the bumper of FIG. 4 with a highly cut-out nose, a rapid increase in the rigidity over the first millimeter of compression to reach a lower value of approximately 25 N/mm, then until compression of 9 mm, a curve which is roughly flat, between 20 and 30 N/mm.

On the third curve 74 for the bumper of FIG. 5 with a deeply cut out nose and a H height difference between the bosses 58, 60 of 2 mm, we observe good progressivity of the rigidity over the first two millimeters of depression, which significantly limits the impact of the arrival of the part against this bumper.

Then, for this third curve 74 after the compression of 2 mm corresponding to the contact with all bearing faces 48, we observed a rigidity between 20 and 30 N/mm, up until a compression of approximately 9 mm.

We hence economically created, with a simple modification of the tooling used for molding the suspension bumpers and without any changes to the vehicle or the assembly procedure, improved comfort. In particular, we can use materials which have lower performance for progressivity and which are less expensive, by compensating for the reduced progressivity with forms in accordance with the invention, which allows for an equivalent level to be reached.

The invention claimed is:

1. A suspension bumper for a suspension of a motor vehicle, comprising a part molded in elastomer, said part being essentially symmetrical in revolution around a main axis of compression, said bumper comprising an end which forms a crown with bearing faces intended to receive the pressure of a moving part and a circumferential side surface, wherein the crown comprises at least first and second compressible bosses at an axial end of said crown; said first and second bosses being separated by notches distributed around the circumference of this crown, said at least first and second compressible bosses being of different heights such that at least one first compressible boss is taller than said at least one second compressible boss such that a bearing face of said at least one compressible boss is axially spaced from a bearing face of said at least one second compressible boss;

said suspension bumper having a dynamic rigidity, wherein upon compression, said first and second compressible bosses progressively increase said dynamic rigidity of the suspension bumper;

wherein said first compressible boss compresses prior to said second boss when subject to pressure from said moving part.

2. The suspension bumper in accordance with claim 1, wherein the notches include a round bottom.

3. The suspension bumper in accordance with claim 1, wherein the end, which forms the crown defines a conical form which narrows at a bottom of said conical form.

4. The suspension bumper in accordance with claim 3, wherein the notches have a height exceeding half a height of the conical form.

5. The suspension bumper in accordance with claim 1, wherein the at least first and second compressible bosses have side surfaces which define, in part, the circumferential side surface of said crown; said bosses comprising vertically extending grooves on said circumferential side surfaces.

6. The suspension bumper in accordance with claim 1, wherein a height difference (H) between the bearing faces of the at least first and second compressible bosses is between 0.5 and 5 mm.

7. The suspension bumper in accordance with claim 6, wherein the height difference (H) between the bearing faces of the at least first and second compressible bosses is approximately 2 mm.

8. The suspension bumper in accordance with claim 1, wherein said dynamic rigidity of the bumper across a range of several millimeters is between 20 and 30 N/mm, for a compression beginning after pressure across all of said bearing faces.

9. The suspension bumper in accordance with claim 1, wherein said bumper is manufactured from a polyurethane elastomer material.

10. A motor vehicle with suspensions fitted with suspension bumpers of claim 1.

* * * * *